United States Patent [19]
Breant et al.

[11] 3,740,478
[45] June 19, 1973

[54] PSEUDO-RANDOM MULTIPLEX SYNCHRONIZER

[75] Inventors: Pierre Louis Vincent Breant, Clamart; Guy Albert Jules David, Thiasis; Francois Pares, Juvisy; Jean-Claude Grima, Chatillon sous Bagneux, all of France

[73] Assignee: U.S. Philips Corporation, New York, N.Y.

[22] Filed: Oct. 19, 1971

[21] Appl. No.: 190,555

[52] U.S. Cl. .......................... 179/15 BS, 178/69.5 R
[51] Int. Cl. .......................... H04j 3/06
[58] Field of Search .......................... 179/15 BS, 15 BY, 179/15 BZ, 69.5 R

[56] References Cited

UNITED STATES PATENTS

| | | | |
|---|---|---|---|
| 3,402,265 | 9/1968 | Couvillon | 178/69.5 R |
| 3,566,268 | 2/1971 | Webb | 178/69.5 R |
| 3,597,547 | 8/1971 | Roll | 179/15 BS |
| 3,629,505 | 12/1971 | Zegers | 178/69.5 R |
| 3,648,237 | 3/1972 | Frey | 179/15 BS |
| 3,662,114 | 5/1972 | Clark | 179/15 BS |

*Primary Examiner*—Ralph D. Blakeslee
*Attorney*—Frank R. Trifari

[57] ABSTRACT

The invention relates to a time division multiplex signal transmission system using pulse code modulation, in which the transmitter comprises a plurality of channels for the information signals and at least one synchronizing channel to which a pseudo-random signal generator applies the multiplex synchronizing code pulses. The information signal pulses and the synchronizing code pulses are cyclically distributed in time within the frame period by means of a channel distributor operating at clock pulse frequency. The receiver comprises a clock frequency extractor for recovering the clock frequency from the received multiplex signals and further comprises, like the transmitter, a plurality of channels for the information signals and at least one synchronizing channel. The received multiplex signals are distributed in cyclic time sequence by means of a channel distributor under the control of the recovered clock pulses. The receiver finally comprises a device for synchronizing the channel distributor of the receiver with the channel distributor of the transmitter.

8 Claims, 4 Drawing Figures

PATENTED JUN 19 1973

3.740.478

SHEET 1 OF 3

Figure 1:
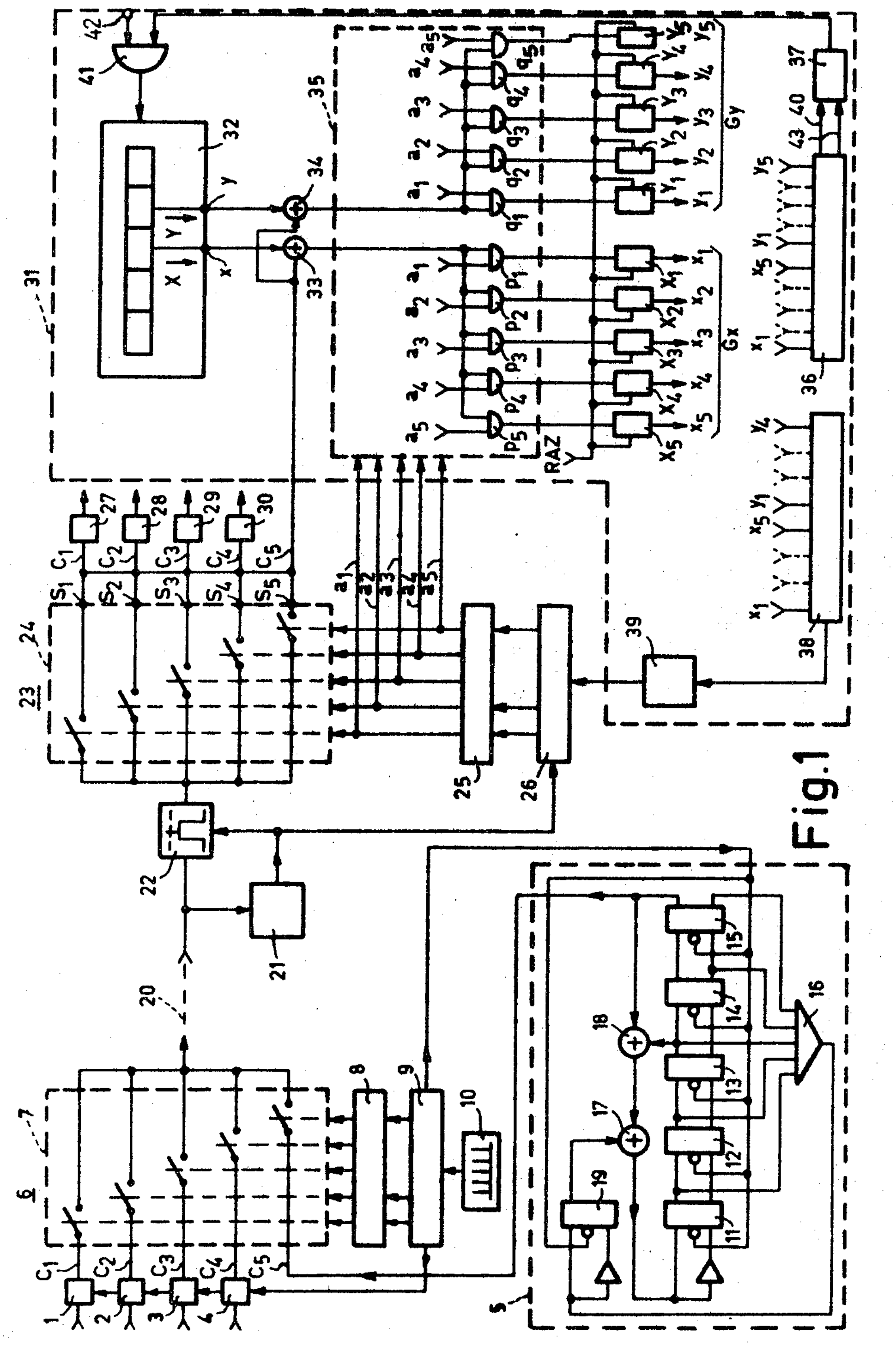

INVENTORS
PIERRE L. V. BREANT
GUY A. J. DAVID
FRANCOIS PARES
BY JEAN-CLAUDE GRIMA

Frank R. Trifari
AGENT

INVENTORS
PIERRE L.V. BREANT
GUY A. J. DAVID
FRANCOIS PARES
BY JEAN-CLAUDE GRIMA
AGENT

INVENTORS
PIERRE L.V. BREANT
GUY A.J. DAVID
FRANCOIS PARES
BY JEAN-CLAUDE GRIMA

AGENT

PSEUDO-RANDOM MULTIPLEX SYNCHRONIZER

Such a transmission system is described in U.S. Pat. No. 3,619,510. In this system synchronism of the channel distributors of the transmitter and the receiver is obtained with a high degree of certainty even when the probability of interference in the transmission path is of the order of 10 percent. However, it has been found that with the synchronizing device described in the said patent the time required for establishing synchronism may be too long, (for example of the order of one second) for certain applications.

It is an object of the present invention to provide a transmission system in which the receiver includes a synchronizing device of a different conception. At the same interference level in the transmission path and with a very simple structure the time required to establish or restore synchronism is reduced by a factor which may be equal to the product of the number of channels of the multiplex system and the number of bits of the synchronizing code. For example, in a multiplex system comprising only five channels and using a synchronizing code of 30 bits the said factor of reduction may be 150.

According to the invention a time division multiplex transmission system is characterized in that the synchronizing device of the receiver includes a local code generator which at *m* outputs supplies *m* copies of the synchronizing code which are mutually shifted by a certain number of bits of this code, each of these *m* outputs being connected to one input of one of *m* modulo-2 adders the other output of which is connected to the combined outputs of the channel commutation switch, while the outputs of the *m* adders are each connected to the input of one of *m* groups which each comprise *n* counters. All these counters are reset to zero at the beginning of a copy supplied at a reference output of the local code generator and each are provided with an output for a predetermined counting threshold. The connection between the outputs of the adders and the inputs of the counters is established by means of a logical arrangement which is controlled by the output signals of the channel distributing circuit in a manner such that for comparing *m* given copies with the signals of all the N channels of the multiplex system the *n* counters of each group of counters are connected each to the associated adder, first in the time intervals of the *n* channels of a group of *n* channels during the appearance of a synchronizing code at the said reference output and then in the time intervals of the *n* channels of a given number of other groups of *n* channels during a given number of consecutive synchronizing codes which appear at the said reference output. The number of synchronizing codes and the number of groups of *n* channels is chosen so that all the time intervals of all the N channels are utilized, while in the synchronizing device of the receiver there are further connected to the outputs of the counters a circuit for controlling the shifting of the local code generator and a circuit for controlling the shifting of the channel distributor. These circuits are arranged so that, when at the end of a cycle of comparing *m* given copies with the signals of the N channels of the multiplex system the threshold values of all the counters are reached, shifts of the local code generator are effected so that it supplies *m* other copies, and also that, when at the end of a synchronizing code appearing at the said reference output the counting threshold is not reached in a counter which correspond to a given channel and a given copy, the local code generator and the channel distributor are shifted so as to cause the said channel to coincide with the synchronizing channel and so as to cause the said copy to appear at the said reference output of the local code generator.

When the frame of the multiplex system includes a sub-frame the steps according to the invention may be equally applied to this sub-frame, enabling this sub-frame to be rapidly synchronized.

When the multiplex system is used in a satelite telecommunication system for the transmission of information between mobile stations and a fixed station, it is particularly advantageous to use the sub-frame synchronizing signal also as a telemetering signal for finding the positions of the mobile stations.

Figure 2:
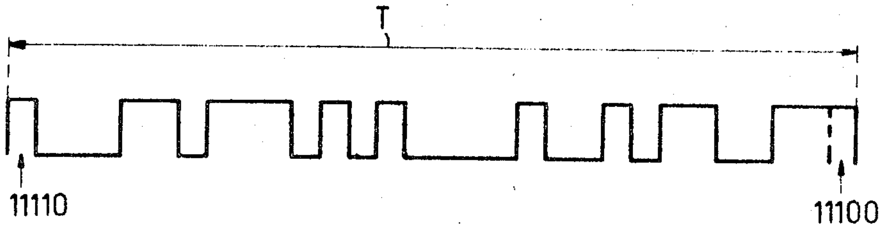
Figure 4:
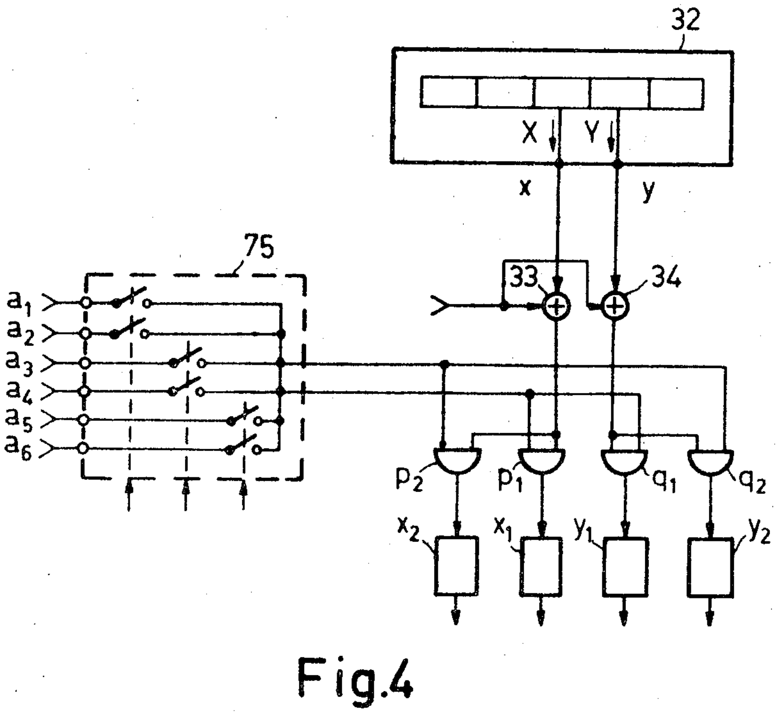
Figure 3:
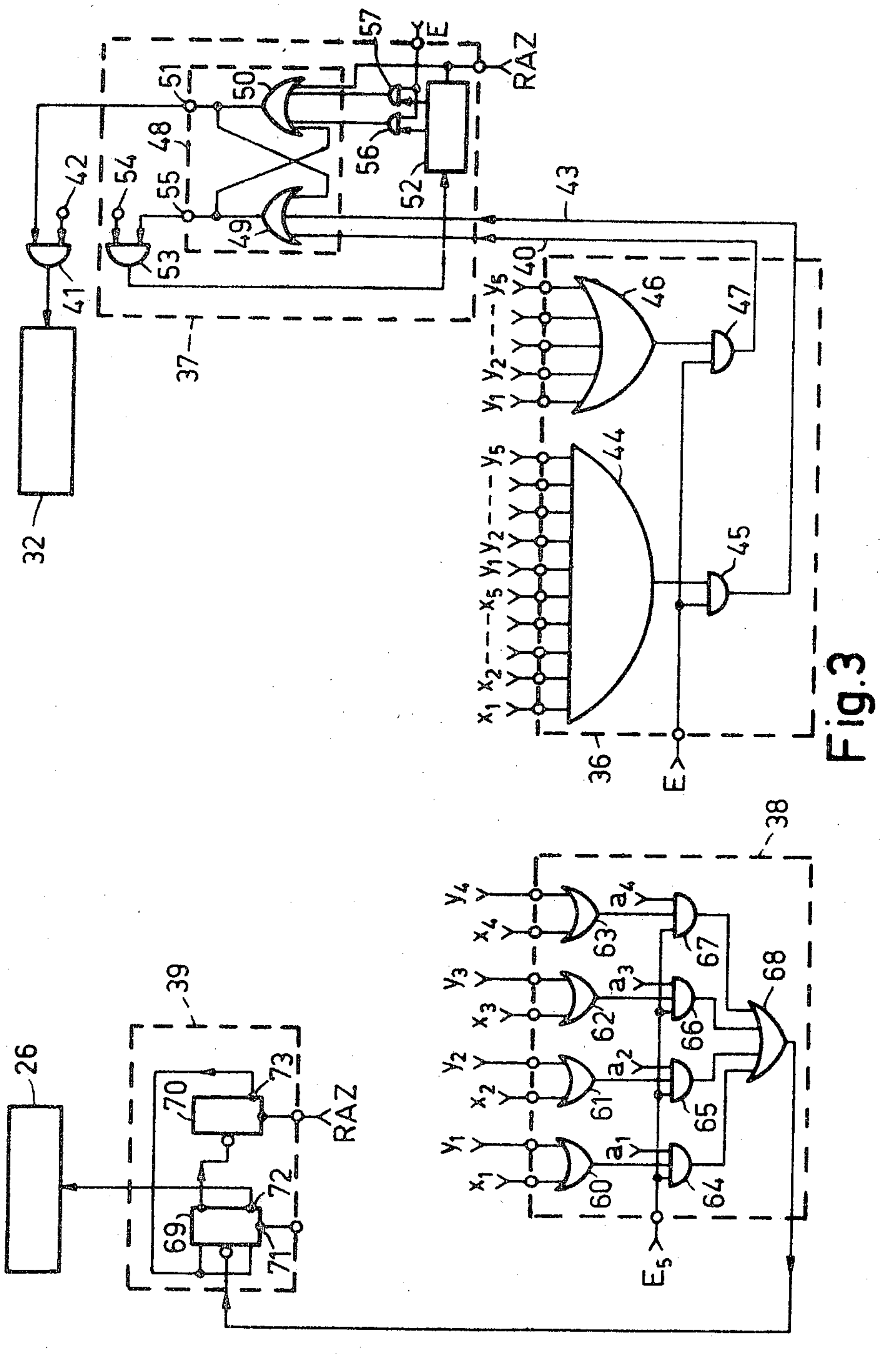

Embodiments of the invention will now be described, by way of example, with reference to the accompanying diagrammatic drawings, in which:

FIG. 1 shows an embodiment of the transmission system according to the invention, FIG. 2 shows diagrammatically the synchronizing code used in the system shown in FIG. 1, FIG. 3 shows an embodiment of the circuits for shifting the local code generator and the channel distributor, and FIG. 4 shows a modified embodiment of the structure of the logical arrangement by which the adders are connected to the counters.

FIG. 1 shows an embodiment of a multiplex signal transmission system according to the invention. In this embodiment the transmitter comprises five channels C1 to C5, four of which, $C_1$, $C_2$, $C_3$ and $C_4$, are assigned to information signals, while one, $C_5$, is allotted to the synchronizing signal. The four separate informations to be transmitted are applied to the four corresponding channels by means of, for example, four delta-modulators 1, 2, 3 and 4 in the form of the presence or absence of pulses.

Similarly to what is described in the said U.S. Pat. No. 3,619,510 the synchronizing channel $C_5$ is fed by a pseudo-random code generator 5.

The pulses from the five channels $C_1$ to $C_5$ are distributed in time by means of a channel distributor 6 comprising a channel commutation switch having 5 separate inputs which are sequentially connected to the output of the switch during the time intervals allotted to the respective channels under the control of the output signals of a distribution circuit 8.

This distribution circuit 8 may be constituted by 5 and-gates, not shown, the inputs of which are connected to the stages of a five- position counter 9, to which are applied the clock pulses from a clock pulse generator 10. The frequency of the clock pulses is, for example, 90 kHz and the frame frequency within which the five channels are distributed is 18 kHz.

In the embodiment shown in FIG. 1, the pseudo-random code transmitted in the channel $C_5$ by the generator 5 is a periodic code of 30 bits the successive bits of which are delivered at the frame frequency (18 kHz). Each bit has the duration of a frame period (about 55 $\mu$s). In order to obtain this code, the generator 5 includes a shift register comprising 5 flip-flops 11, 12, 13, 14 and 15, which are fed back by means of an and-gate 16, two adders 17 and 18 and a holding flip-flop 19. In the embodiment shown in FIG. 1, the pseudo-random code of 30 bits is applied to the channel $C_5$ by the flip-flop 15. This pseudo-random code is slightly shorter than the code of 31 ($2^5-1$) bits which a five flip-flop register could supply, however, it has excellent auto-correlation properties. The shifts of the register are obtained by the signal applied at the frame frequency in one position of the five-position counter 9.

With a generator 5 having a circuit diagram as shown in FIG. 1, there is obtained as the synchronizing signal the pseudo-random code, one period of duration T of this code which comprises 30 bits is shown in FIG. 2. The repetition frequency of this code is (18,000/30) = 600 Hz. The first bit corresponds to the state 11110 of the five flip-flops of the register, while the last bit corresponds to the state 11100 of these five flip-flops.

The multiplex signals supplied by the transmitter are transmitted through the transmission path 10 to the receiver which comprises a known arrangement 21, which accurately restores the frequency and the phase of the 90 kHz clock pulses of the transmitter, so that by means of the local clock pulses supplied by the arrangement 21 both the shapes and the instants of occurrence of the signal pulses received are regenerated in a pulse regenerator 22.

Like the emitter, the receiver comprises 5 channels C1 to C5, four information channels $C_1$, $C_2$, $C_3$ and $C_4$ and one synchronizing channel $C_5$. The received multiplex signals after being regenerated are distributed in cyclic sequence between the different channels by means of a channel distributor 23 which, like the channel distributor 6 of the emitter, comprises a commutation switch 24, a distribution circuit 25 and a five-position counter 26 the stepping of which is controlled by the 90 kHz local clock pulses supplied by 21.

The pulses which during a frame period successively appear at the outputs $S_1$ to $S_5$ of the switch 24 are respectively applied to the five channels $C_1$ to $C_5$. In the in-synchronism condition of the channel distributors of the transmitter and the receiver the pulses successively transmitted in the five channels C1 to C5 of the transmitter are exactly distributed to the same channels of the receiver, enabling the pulses of the information signals present in the channels $C_1$, $C_2$, $C_3$,$C_4$ to be processed respectively in analog / digital converters 27, 28, 29, 30 and to be subsequently applied to the corresponding loads. Like in the transmitter, the synchronizing signal pulses are present in the channel $C_5$, i.e. the signal obtained in this channel $C_5$ of the receiver will be found to be synchronous with the transmitted synchronizing signal with the exception of the time of propagation in the transmission path.

In the out-of-synchronism condition, however, the synchronizing code may appear in any of the channels of the receiver, for it may be shifted with respect to its theoretical position, which corresponds to synchronism, through any number of periods of local clock pulses contained in its period T.

In the embodiment under consideration, in which the local clock pulse frequency is 90 kHz and the frequency of the synchronizing signal is 600 Hz, the number of possible shifts is (90,000/600) − 1 = 149.

Therefore, the receiver shown in FIG. 1 comprises a synchronizing device 31, by means of which shifting instructions for the channel distributor 23 are provided so as to bring the received synchronizing code to its theoretical position in the channel $C_5$.

In the known synchronizing devices, for example as described in the aforementioned U.S. Pat. No. 3,619,510, a synchronism detector circuit performs a correlation test, bit by bit, between a sequence of 30 bits received in the synchronizing channel $C_5$ and a local sequence identical with the synchronizing code; after each unsuccessful correlation test performed on a received 30-bit sequence an adjusting circuit causes the channel distributor to shift by a 90 kHz period.

A correlation test is considered to be unsuccessful if, for example, the number of errors between the 30 bits of the checked sequence and the 30 bits of the local synchronizing code is at least equal to seven; when the number of errors is less than seven a calculation shows that synchronism will be obtained with a high degree of certainty even if the interference level in the transmission path is 10 percent.

It will be appreciated that in this arrangement, in which during a sequence of 30 bits only a single correlation test is performed, 149 consecutive 30-bits sequences must be used to perform the 149 correlation tests necessary in the worst case to restore synchronism. As these sequences are provided in a rhythm of 600 Hz in the worst case the overall time required to restore synchronism is 149 · (1/600) seconds ≈250 ms.

The present invention provides a synchronizing device which permits the time for restoring synchronism to be considerably reduced whilst retaining the tolerance to interference levels in the transmission path of the order of, say 10 percent.

According to the invention the synchronizing device 31 of the receiver of FIG. 1 comprises a local code generator 32, which at $m = 2$ outputs designated $x$ and $y$ supplies 2 copies of the synchronizing code which are mutually shifted by a certain number of bits of this code. This local generator 32 is preferably identical with the synchronizing code generator 5 of the transmitter. In the drawing, there are schematically shown in the generator 20 the five flip-flops of the register which are capable of providing five copies of the synchronizing code which are shifted one bit in each consecutive flip-flop. In the example chosen, 2 copies C and Y are used which are provided by 2 consecutive flip-flops and hence are relatively shifted by one bit. Each output $x$ and $y$ is connected to one input of a modulo-2 adder 33 and 34 respectively, the other input of which is connected to the interconnected outputs $S_1$ to $S_5$ of the channel switch 34. The outputs of the two adders 33 and 34 are connected to the inputs of the two groups $Gx$ and $Gy$ respectively which each comprise $n$ counters; in the example chosen in FIG. 1, $n$ is equal to the number $N = 5$ of multiplex channels.

All the counters are reset to zero by a signal RAZ which appears at the beginning of the copy X at the output $x$ which in this example is used as the reference output. The signal RAZ is a pulse which occurs immediately after the instant at which the first bit of this copy appears. This first bit according to FIG. 2 corresponds to the state 11110 of the 5 flip-flops of the register. This pulse is shorter than the time allotted to a channel.

Each counter has an output for a predetermined counting threshold. The five counters of the group $Gx$, which are designated by $X_1$ to $X_5$, at these outputs supply logic signals $x_1$ to $x_5$ respectively. The five counters $Y_1$ to $Y_5$ of the group Gy at the corresponding outputs supply the logic signals $Y_1$ to $Y_5$ respectively.

The connection of the outputs of the adders 33 and 34 to the inputs of the counters is established by means of a logical arrangement 35 which is controlled by the output signals $a_1$, $a_2$, $a_3$, $a_4$, $a_5$ of the channel distribution circuit 25. This logic arrangement consists of 5 and-gates $p_1$ to $p_5$, the outputs of which are connected to the inputs of 5 counters $X_1$ to $X_5$ respectively, and of five and-gates $q_1$ to $q_5$ the outputs of which are connected to the inputs of 5 counters $Y_1$ to $Y_5$ respectively. The arrangements which each consist of two gates ($p_1$, $q_1$), ($p_2$,$q_2$), ($p_3$,$q_3$), ($p_4$, $q_4$), ($p_5$, $q_5$) are controlled by the channel distribution signals $a_1$, $a_2$, $a_3$, $a_4$, $a_5$, respectively.

Thus, the five counters of each group ($X_1$ to $X_5$ for the group Gx, $Y_1$ to $Y_5$ for the group Gy) are connected to the associated one of the adders 33 and 34 respectively in the time intervals of the five multiplex channels $C_1$ to $C_5$. Since all the counters are reset to zero by the signal RAZ at the beginning of each synchronizing codes which appears at the output $x$ of the generator 22, it will be clear that during a synchronizing code each counter counts the number of anti-conicidences (or errors) between 30 bits supplied by a copy X or Y and 30 bits received through one of the channels $C_1$, $C_2$, . . . , $C_5$ of the multiplex system. Thus, the counter $X_1$ counts the number of errors between the copy X and the signals in the channel $C_1$; the counter $Y_3$ counts the number of errors between the copy Y and the signals in the channel $C_3$.

In the case shown in FIG. 1, in which the number of channels $N = 5$ is equal to the number $n$=5 of counters of each group of counters, there is a singlegroup of five channels so that a single single group code is sufficient to compare the 2 copies X and Y with the signals received through the five channels of the multiplex system.

Whereas in the known arrangement only a single comparison (or correlation test) was effected during the 30 bits of the synchronizing code, by means of the arrangement of the invention 10 correlation tests are performed in the same time, so that the time required to restore synchronism is reduced by a factor of 10. In the example described, this time is reduced from 250 ms to 25 ms.

For the purpose of automatically effecting all the correlation tests and obtaining synchronism the synchronizing device comprises a logic circuit 36 which supplies to the control circuit 37 instructions for shifting the local code generator 32, and a logic circuit 38 which supplies to the control circuit 39 instructions for shifting the channel distributor 23. These logic circuits are controlled by the logical output signals of the counters: $x_1$ to $x_5$ and $y_1$ to $y_5$ for the circuit 36, and $x_1$ to $x_4$ and $y_1$ to $y_4$ for the circuit 38. These logical signals change their values when in the corresponding counters the predetermined counting threshold is reached. The counting threshold may, for example, correspond to the end position of the counter, The counting threshold may, for example, be seven and, as has been described, corresponds to the number of errors below which it is assumed, taking into account the interference level in the transmission path, that sufficient correlation has been obtained between 30 of the of a copy and 30 bits received through one ofthe channels of the multiplex system.

The logic circuit 36 supplies to the control circuit 37 instructions for shifting the local code generator 32 in two different conditions.

Firstly, a shift order is given when all the counters $X_1$ to $X_5$ and $Y_1$ to $Y_5$ have reached their end positions on termination of a cycle of comparison of the two copies X and Y with the signals in the five channels, i.e. in the present case on termination of each synchronizing code which appears at the reference output $x$ of the generator 32. In this case the circuit 36 applies a logical signal to the control circuit 37 through a link 40. The control circuit 37 then will block an and-gate 41 for the duration of the two bits of the synchronizing code (duration of each bit: (1/18,000) second $\approx 55$ $\mu$s). When the pulses at 18 kHz which cause the register of the generator 32 to step are applied to the input 42 of the and-gate 41, the stepping of this register is stopped for the duration of these two bits; then it will normally go on again. After this operation of the control circuit 37, two new copies X and Y are obtained which each are shifted two bits relative to the respective preceding one; subsequently at the beginning of the next synchronizing code which appears at the output $x$ of the generator 32 the aforedefined signal RAZ occurs which resets all the counters to zero, and a new cycle of comparison begins in which the two new copies are used. In the present case in which the synchronizing code comprises 30 bits and two copies are used which are supplied by two consecutive flip-flops of the register of the generator 32, at most 15 shifts of 2 bits each are required to find the synchronizing code among the miltiplex signals received.

When at the end of a synchronizing code which appears at the reference output $x$ of the generator 32 one of the counters has not reached its end position, the circuit 36 through a link 43 supplies another shift instruction to the control circuit 37 so that the copy corresponding to the respective counter will be provided at the reference output $x$ of the generator 32: this shift order is only produced in the case in which the counter found appertains to the counter group $Gy$, because if it appertains to the group $Gx$ the copy is in the correct position. When the circuit 37 receives a shift instruction through the link 43, it stops the stepping of the register of the generator 32 for the duration of one bit (55 $\mu$s), and the Y copy will be supplied at the output $x$.

In the same condition in which one of the counters does not reach its end position on termination of the reference synchronizing code, the logic circuit 38 applies to a control circuit 39 a shift instruction for the channel distributor 23 so as to cause the channel which corresponds to the counter to coincide with the synchronizing channel $C_5$. Obviously, this instruction occurs only when the channel found is one of the information channels $C_1$ to $C_4$. Therefore, only the output signals of the counters $x_1$ to $x_4$ and $y_1$ to $y_4$ are applied to the circuit 38. In order to shift the channel distributor 23 the control circuit 39 sets the five-position counter 26 to the position 5 corresponding to the channel $C_5$ as soon as a shift instruction is applied to it (i.e. during one of the 5 frame bits contained in the last bit of the local reference code). The counter 26 is maintained in the position 5 until the end of the last frame bit of the local reference code, which last frame bit corresponds to the channel $C_5$. As a result, the synchronizing signal received is applied to the channel $C_5$ alotted to it, and when the instruction for shifting the channel distributor is cancelled, operation of the channel distributor is normally resumed.

After the two shifts of the local code generator and the channel distributor synchronism of the channel distributors of the transmitter and the receiver is obtained. The local code which appears at the reference output $x$ is synchronous with the synchronizing code of the transmitter.

FIG. 3 shows the circuit diagram of an embodiment of the circuits 36 and 37 and of the circuits 38 and 39 for the embodiment of the transmission system shown in FIG. 1.

The circuit 36 comprises as and-gate 44 with 10 inputs to which are applied the output signals of the 10 counters, the output of this gate being connected to one input of an and-gate 45. To the other input of this and-gate 45 is applied a sampling pulse E which occurs during the last frame bit contained in the last bit of the local reference code. Hence, when all the counters have reached their end positions at the instant at which the pulse E appears, a shift instruction is applied to the control circuit 37 through the link 40 so as to stop the stepping of the register of the local generator 32 for the duration of 2 bits of the synchronizing code.

The circuit 36 also includes an or-gate 46 having 5 inputs to which are applied the output signals of the counters $Y_1$ to $Y_5$, the output of this or-gate being connected to an input of an and-gate 47. To the other input of this and-gate 47 is applied the aforementioned sampling pulse E. Thus, when any of the counters $Y_1$ to $Y_5$ has not reached its end position at the instant at which the pulse E appears, a shift instruction is applied to the control circuit 37 through the link 43 so as to stop the stepping of the register of the local generator 32 for the duration of one bit of the synchronizing code.

The control circuit 37 comprises a flip-flop 48 which is constituted by two suitably connected or-gates 49 and 50 and the output 51 of which assumes the state 0 when a shift instruction reaches it through the link 40 or 43. In this case the flip-flop 48 is in the operative position. Thus, the 18 kHz pulses applied to the input 42 of the and-gate 41 no longer reach the generator 32, and the stepping of the register of this generator is stopped. However, these 18 kHz pulses which do no longer reach the generator 32 are counted in a three-position counter 52 via an and-gate 53 one input 54 of which is fed with the 18 kHz pulse while the other input is connected to the complementary output 55 of the flip-flop 48. This counter 52 is reset to its zero position by the aforementioned signal RAZ.

When the counter 52 is in one of its positions "one" or "two" and the aforementioned sampling pulse E is produced, the flip-flop 48 is rendered inoperative via an and-gate 56 or an and-gate 57. According as the shift instruction comes from the or-circuit 46 (one of the counters of the group Gy has not reached its end position) or from the and-circuit 44 (all the counters have reached their end positions) the flip-flop 48 is rendered inoperative after one shift pulse or two shift pulses has or have been counted in the counter 52, and the stepping of the register of the generator 32 is normally resumed. In the one case one shift pulse of the register of the generator 32 is suppressed, i.e. the copy Y appears at the output $x$; in the other case two shift pulses are suppressed, i.e. two new copies which are shifted two bits relative to the preceding ones appear at the outputs $x$ and $y$ of the generator 32.

At the beginning of the next synchronizing code the pulse RAZ renders the flip-flop 48 inoperative and resets the counter 52 to the position "zero."

FIG. 3 also shows an embodiment of the circuits 38 and 39 by means of which the channel distributor is shifted when any one of the counters $X_1$ to $X_4$ or $Y_1$ to $Y_4$ does not reach its end position.

The logic circuit 38 comprises four or-gates 60, 61, 62 and 63 to the two inputs of each of which are applied the output signals of the counters $(x_1, y_1)(x_2, y_2)$, $(x_3, y_3)$ and $(x_4, y_4)$, respectively. The outputs of these four or-gates are connected each to one input of one of four and-gates 64, 65, 66 and 67 respectively, to an other input of which are applied the output signals of the distribution circuit $a_1$, $a_2$, $a_3$ and $a_4$ respectively which correspond to the channels $C_1$, $C_2$, $C_3$ and $C_4$, respectively. To a third input of each of the and-gates 64 to 67 is applied a sampling signal $E_5$ which consists of five sharp pulses which are produced only during the last bit of the local reference code and during the signals $a_1$, $a_2$, $a_3$, $a_4$ and $a_5$ respectively, but which are slightly shifted relative to the instants at which these signals appear. The outputs of the four and-gates 64 to 67 are connected each to one input of an or-gate 68.

In this manner when one of the counters $X_1$ to $X_4$ or $Y_1$ to $Y_4$ does not reach its end position during the last bit of the local reference code, at the output of the or-circuit 68 there is obtained a pulse which occurs in the interval in which one of the channels $C_1$ to $C_4$ corresponding to the counter is switched. This pulse is the shift instruction for the channel distributor applied to the control circuit 39.

The control circuit 39 comprises two flip-flops 69 and 70. The flip-flop 69 is rendered operative by the pulse supplied by the logical circuit 38 and rendered inoperative systematically by 180 kHz pulses applied to a reset- to-zero input 71. As soon as a shift instruction is applied, the flip-flop 69 via its output 72 sets the five-position counter 26 of the channel distributor to its position 5 which corresponds to the synchronizing channel $C_5$. Simultaneously the flip-flop 70 is rendered operative and via its output 73 connected to inputs J and K of the flip-flop 69 maintains this flip-flop 69 in the operative position, and this also results in that the counter 26 is maintained in its position 5. During the fifth frame bit of the last bit of the local reference code, the counter 26 is still in the position 5, and the channel distributor of the receiver is correctly set. Immediately at the beginning of the first bit of the next synchronizing code supplied at the reference output of the local generator, which itself may have been shifted, the pulse RAZ is produced which renders the flip-flop 70 inoperative, with the consequence that the flip-flop 69 is also rendered inoperative, so that the five-position counter 26 steps normally so as to maintain the correct setting obtained for the channel distributor.

The synchronizing arrangement of a transmission system according to the invention may be modified in a large variety of manners for the same number N of channels of the multiplex and for the same number M of the bits of the synchronizing code.

We will first take the case considered hitherto, in which the number $n$ of counters of each group of counters is equal to the number N of channels so that during a synchronizing code N.$m$ correlation tests may be performed, where $m$ is the number of copies simultaneously utilized. Within the scope of the invention the number $m$ of copies is such that: $2 \leq m \leq M$ (1).

In the example used, any number $m$ of copies between 2 and 30 may be used, the time required for restoring synchronism decreasing with increase in the number of copies used.

In FIG. 1 it has been assumed that $m = 2$. However, $m$ may be made equal to five and these five simultaneous copies may be obtained by means of the 5 filpflops of the feed-back register of the generator 32 the five outputs of which in this case are to be connected to 5 adders, while the outputs of the adders then would be connected through and-gates, as shown in FIG. 1, to 5 groups of 5 counters each.

If $m$ is made equal to 30, 30 simultaneous copies may be obtained by extending the 5-flip-flop feed-back register of the generator 32 by an open 25-flip-flop register. In this extreme case a single synchronizing code is sufficient to determine the channel and the copy in which sequences of 30 bits are in synchronism. The time required for this determination then is (1/600) second $\approx 1.6$ ms.

Compared with the known systems this time is reduced by a factor equal to the product of the number of channels and of the number of bits of the synchronizing code.

Alternatively, unlike the embodiment shown in FIG. 1, a number $n$ of counters in each group may be used which is less than the number N of multiplex channels and this number $n$ may in the limiting case be equal to 1. Within the scope of the invention the number $n$ of counters of each group of counters is such that:

$$1 + n = N \qquad (2)$$

According to the invention any values of $m$ and $n$ be chosen which are defined by the relationships (1) and (2).

When the number $n$ of counters of each group is less than the number N of channels of the multiplex there are performed during a synchronizing code which is produced at the reference output only $n.m$ correlation tests, where $m$ is the number of copies which are simultaneously used. In order to perform with $m$ given copies correlation tests on all the channels (N.$m$ tests) these $m$ copies will be repeated during a certain number of codes. The logical arrangement connects the adders to the counters, first in the time intervals of the $n$ channels of a group of $n$ channels during a synchronizing code produced at the reference output, then in the time intervals of the $n$ channels of a given number of other groups of $n$ channels during a given number of consecutive synchronizing codes produced at the reference output. The number of synchronizing codes and the number of groups of $n$ channels being so chosen that all the time intervals of all the N channels are utilized. The shifting devices for the local code generator and for the channel distributor are to be adapted to this method of operation. When all the counters have reached their end positions, the local code generator will only be shifted to supply $m$ other copies after $m$ copies have been compared with the signals in the N channels. In contrast therewith, when one counter does not reach its end position, the local code generator and the channel distributor can be shifted at the end of the each synchronizing code in order to produce at the reference output the copy which corresponds to the counter and to bring the channel which corresponds to the counter in coincidence with the synchronizing channel.

Preferably, in order to simplify the structures of the logical circuits of the synchronizing arrangement the number $n$ of counters of a group of counters and/or the number of channels of a group of channels is a submultiple of the number N of multiplex channels.

FIG. 4 shows by way of example the structure of the logical arrangement which connects the adders to the counters for the case of a multiplex of $N = 6$ channels, $n$ being 2. Like in FIG. 1, two copies X and Y are used which each are applied to one input of an adder 33 and 34 respectively to the other input of which the multiplex signals of all the channels are applied. Each group of counters comprises 2 counters ($X_1$, $X_2$) and ($Y_1$, $Y_2$) which are connected to the adders 33 and 34 through and-gates ($p_1$, $p_2$) and ($q_1$, $q_2$) respectively. The output signals $a_1$ to $a_6$ of the channel distributor are applied to a channel group commutation switch 75. During a first code produced at the reference output $x$ this switch applies the signals ($a_1$, $a_2$) of the distributor to the 4 and-gates, so that after this first code the correlation test between the 2 copies X and Y and the signals received in the group of 2 channels switched by $a_1$, $a_2$ have been performed. During a second code and then a third code, using the same copies, the switch 75 applies the signals ($a_3$, $a_4$) and then ($a_5$, $a_6$) to the 4 and-gates.

In this case a comparison of the 2 copies X and Y with the signals of the N channels takes the duration of 3 synchronizing codes. At the end of each code a counter which has not reached its end position indicates the copy and the channel which are correlated.

It will be seen that all the possible modifications of the synchronizing arrangement according to the invention enable the best possible compromise between the price and the time required to obtain synchronism to be realized.

When the frame of the multiplex includes a subframe, the steps according to the invention may equally be applied to this sub-frame, permitting this sub-frame to be rapidly synchronized.

For this purpose in the emitter a synchronizing signal in the form of a pseudo-random code is transmitted through a channel of this sub-frame and is used in the receiver to synchronize this sub-frame. The subframe synchronizing arrangement has a structure analogous to that used for synchronizing the frame.

When the multiplex system is used in a satelite telecommunication system for the transmission of information between mobile station and a fixed station on the ground, it is particularly advantageous and economical to use the sub-frame synchronizing signal also as a telemetry signal for finding the positions of the mobile stations. In such a system the ground station transmits the sub-frame synchronizing code, which hereinafter will be referred to as the telemetry code, in a channel of the sub-frame. The receiver of the mobile station includes, in addition to the frame synchronizing arrangement, a sub-frame synchronizing arrangement according to the invention which in particular includes a local telemetry code generator. When the sub-frame has been synchronized, the local generator produces at a given output a telemetry code which is shifted relative to the code transmitted by the ground station, the shift being equal to the time of propagation between the ground station and the mobile station. The same arrangements are used in a second multiplex for the communications between the mobile station and the ground station. When this second multiplex is in synchronism (frame and sub-frame), in the ground station a telemetry code is obtained which is shifted relative to the code transmitted in the first multiplex, the shift being a function of twice the distance between the ground station and the mobile station. The value of this time shift may be measured with a high degree of accuracy and provides the exact value of the distance required for the position finding.

The manner in which the steps according to the invention are used for synchronizing a sub-frame od a multiplex in such a telecommunication system will now be described.

The frame of the multiplex is, for example, that described hereinbefore with reference to the FIG. 1. It comprises five channels which are successively switched at a frequency of 90 kHz. The frame frequency is 18 kHz. This frame is synchronized in the aforedescribed manner by means of a synchronizing code of 30 bits, which hereinafter will be referred to as the frame code, at a frequency of 600 Hz.

One of the four information channels of the frame is sub-multiplexed, and in a part of the time equal to 2/10 of the duration of this channel the telemetry code is transmitted which consists of a pseudorandom code of 144 bits produced in a rhythm of 3.6 kbits/second. This pseudo-random code, which is generated by a feedback register comprising eight suitably connected filpflops, is shortened relative to the 255 bit code which the register is capable of providing.

In order to synchronize in the receiver the sub-frame which carries the telemetry code, there must be performed, just as for the frame synchronization, a number of correlation tests in order to find the telemetry code in a received sequence of 144 bits.

As the duration of a correlation test is 40 ms, i.e. the duration of a telemetry code, it is particularly important for the overall duration of these tests to be reduced.

According to the invention, the receiver includes a local generator of the 144-bit code, which generator is identical with that in the transmitter and enables copies of the telemetering code to be supplied which are relatively shifted, the shift being equal to a given number of bits of this code.

It should be noted that when the sub-frame is being synchronized, synchronism of the frame has already been obtained so that the time intervals are known at which the telemetering bits appear, i.e. the channel of the sub-frame which contains the telemetering code is known. Hence, in order to obtain synchronism of the sub-frame it is sufficient to effect shifts of the local generator.

It should also be noted that if, as in the example described, the frequency of the telemetering code (25 Hz) is a submultiple of the frame code frequency (600 Hz), the number of correlation tests to be performed to obtained synchronism may be reduced. During the telemetering code an integral number of frame codes, 24 in the example under consideration, will then be produced. If in the transmitter the beginning of a frame code is made to coincide with the beginning of the telemetering code, it will be clear that in the receiver at will then 24 correlation tests are to be performed to obtain synchronism and that between these tests the local code generator must be shifted, each shift being equal to the duration of a frame code, i.e. the duration of six telemetering code bits. For example, if for performing these tests two copies of the telemetering code are used which are simultaneously provided by the local generator and are relatively shifted, the shift being equal to the duration of 6 bits, two correlation tests may be made during one telemetering code. The time required for performing 24 tests, including the time required for the shifts of the local generator, will then be:

$$(12 + 1)\ 40\ \text{ms} = 520\ \text{ms}.$$

In order to further reduce the duration of these tests, instead of performing them on the entire code of 144 bits they may be performed on a suitably chosen part of this code, for example, on one quarter part, i.e. on 36 bits. This part and its position in the complete code may be so chosen by means of previous simulated tests as to offer a striking contrast with the same portion when shifted.

Thus, by using a part of 36 bits for performing the correlation tests, the above-calculated maximum time of the 520 ms is divided by four and reduced to 130 ms. Obviously, subsequent confirmation tests will have to be taken on the entire code.

What is claimed is:

1. A time division multiplex signal transmission system using pulse code modulation, in which the transmitter comprises a plurality of channels for the information signals and at least one synchronizing channel to which a pseudo-random signal generator applies the multiplex synchronizing code pulses, the information signal pulses and the synchronizing code signals being cyclically distributed in time within the frame period by means of a channel distributor operating at clock-pulse frequency, while the receiver comprises an extractor for recovering the clock frequency from the received multiplex signals and further, like the transmitter, a plurality of channels for the information signals and at least one synchronizing channel, the received multiplex signals being cyclically distributed in time by means of a channel distributor under the control of the recovered clock pulses, the receiver finally comprising an arrangement for synchronizing the channel distributor of the receiver with the channel distributor of the transmitter, characterized in that the receiver synchronizing arrangement comprises a local code generator which supplies at *m* outputs *m* mutually shifted copies of the synchronizing code, the shifts being equal to a given number of bits of this code, each of these *m* outputs is connected to one input of one of *m* modulo-two adders the other input of which is connected to the combined outputs of the channel commutation switch, the outputs of *m* adders being each connected to the input of one of *m* groups which each comprise *n* counters, which counters are all reset to zero at the beginning of a copy produced at a reference output of the local code generator, and each are provided with an output for a predetermined counting threshold, the outputs of the adders are connected to the inputs of the counters by means of a logical arrangement which is controlled by the output signals of the channel distributor circuit in a manner such that in order to compare *m* given copies with the signals of all the N channels of the multiplex the *n* counters of each group of counters are connected to the associated adders, first in the time intervals of the *n* channels of each group of *n* channels during a synchronizing code which appears at the said reference output, then in the time intervals of the $n$ channels of the given number of other groups of $n$ channels during a given number of consecutive synchronizing codes which appear at the said reference output, the number of synchronizing codes and the number of groups of $n$ channels being so chosen that the time intervals of all the channels are utilized, the synchronizing device of the receiver further comprises a circuit for controlling the shifting of the local code generator and a circuit for controlling the shifting of the channel distributor, which circuits are connected to the outputs of the counters and are arranged so that when at the end of a cycle of comparison of $m$ given copies with the signals of the $n$ channels of the multiplex the thresholds of all the counters are reached, the local code generator is shifted so as to provide $m$ further copies, and that, when at the end of a synchronizing code produced at the said reference output the counting threshold is not reached in a counter which corresponds to a given channel and to a given copy, the local code generator and the channel distributor are shifted so that the said channel is made to coincide with the synchronizing channel and the said copy is produced at the said reference output of the local code generator.

2. A system as claimed in claim 1, characterized in that the number $m$ of copies provided by the local generator during a synchronizing code is such that $2 \leq m \leq M$, where $M$ is the number of bits of the synchronizing code.

3. A system as claimed in claim 2, characterized in that the number $n$ of counters of each group, which member is equal to the number $n$ of channels tested during a synchronizing code, is such that $1 \leq n \leq N$, where $N$ is the number of channels of the multiplex.

4. A system as claimed in claim 3, characterized in that $n$ is a submultiple of N.

5. A system as claimed inin which one of the frame channels is a sub-multiplexedchannel in one part of which is applied, at the transmitterend, a synchronizing code for the sub-frame definedby the channel, characterized in that the receivercomprises a sub-frame synchronizing device having thesame structure as the frame synchronizing device.

6. A system as claimed in claim 5, characterized in that the frequency of the sub-frame synchronizing code is a submultiple of the frequency of the frame synchronizing code, the successive shifts of the local generator of the copies of the sub-frame synchronizing code each being equal to the duration of a frame period.

7. A system as claimed in claim 5 characterized in that in order to restore synchronism of the sub-frame the local generator only supplies copies of part of the sub-frame synchronizing code, which part and its position in the code are chosen so as to provide a predetermined marked contrast with the same part when shifted.

8. A system of communication between a fixed station and a mobile station as claimed in claim 5, which system comprises a first multiplex system for the direction from the fixed station towards the mobile station and a second multiplex system for the direction from the mobile station towards the fixed station, in that in order to find the position of the mobile station the telemetering signal used in each multiplex is the sub-frame synchronizing signal.

* * * * *

PO-1050
(5/69)

UNITED STATES PATENT OFFICE
CERTIFICATE OF CORRECTION

Patent No. 3,740,478 Dated June 19, 1973

Inventor(s) PIERRE LOUIS VINCENT BREANT ET AL

It is certified that error appears in the above-identified patent and that said Letters Patent are hereby corrected as shown below:

Col. 5, line 62, "of the" should be --bits--;

line 63, "ofthe" should be --of the--;

Col. 9, line 55, "being" should be --is--;

IN THE CLAIMS

Claim 5, line 1, "inin" should be --in claim 1, in--;

line 2, "sub-multiplexedchannel" should be --sub-multiplexed channel--;

line 3, "transmitterend" should be --transmitter end--;

line 4, "definedby" should be --defined by--;

line 5, "receivercomprises" should be --receiver comprises--;

line 6, "thesame" should be --the same--;

Claim 8, line 6, after "," insert --characterized--;

Signed and sealed this 25th day of December 1973.

(SEAL)
Attest:

EDWARD M.FLETCHER,JR.
Attesting Officer

RENE D. TEGTMEYER
Acting Commissioner of Patents